Dec. 12, 1933.    J. W. LEGG    1,939,067
INSTANTANEOUS PRESSURE RECORDER
Filed Jan. 5, 1929    3 Sheets-Sheet 1

INVENTOR
Joseph W. Legg.
BY
ATTORNEY

Dec. 12, 1933.         J. W. LEGG         1,939,067
INSTANTANEOUS PRESSURE RECORDER
Filed Jan. 5, 1929         3 Sheets-Sheet 2
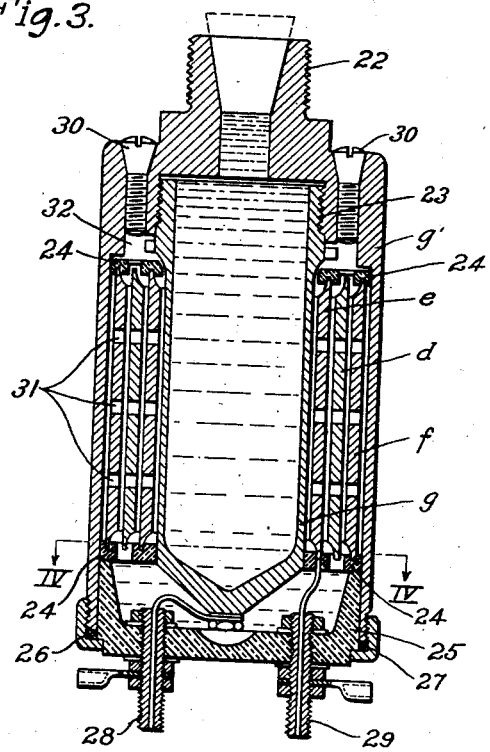
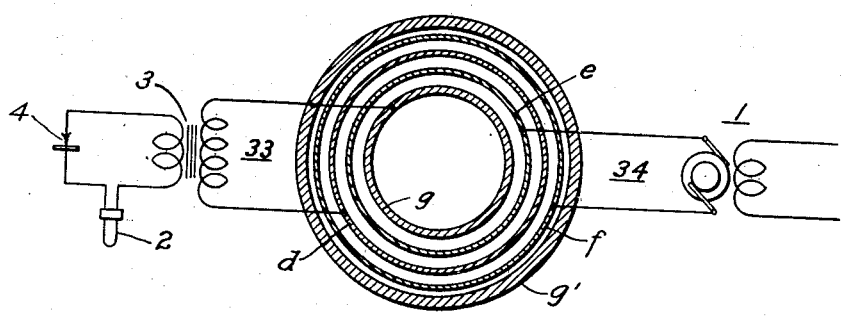
INVENTOR
Joseph W. Legg.

Dec. 12, 1933.                    J. W. LEGG                    1,939,067
                         INSTANTANEOUS PRESSURE RECORDER
                              Filed Jan. 5, 1929           3 Sheets-Sheet 3
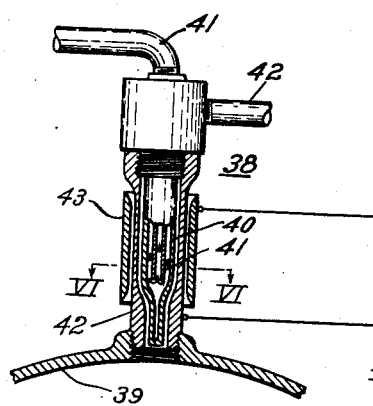
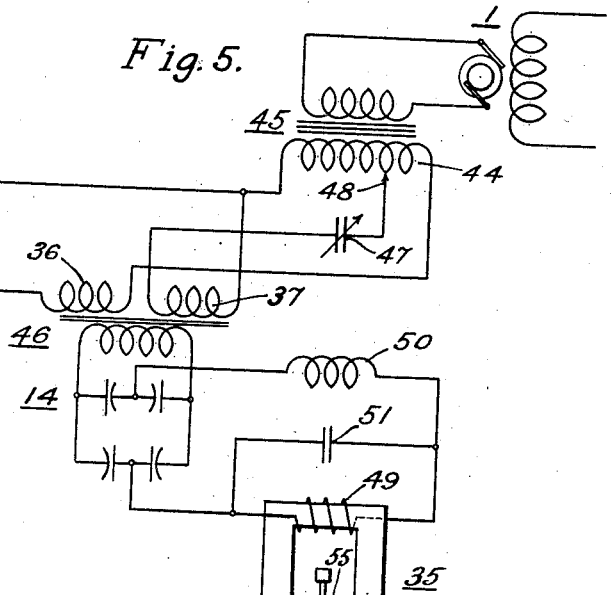
Fig. 6.
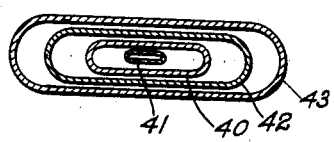
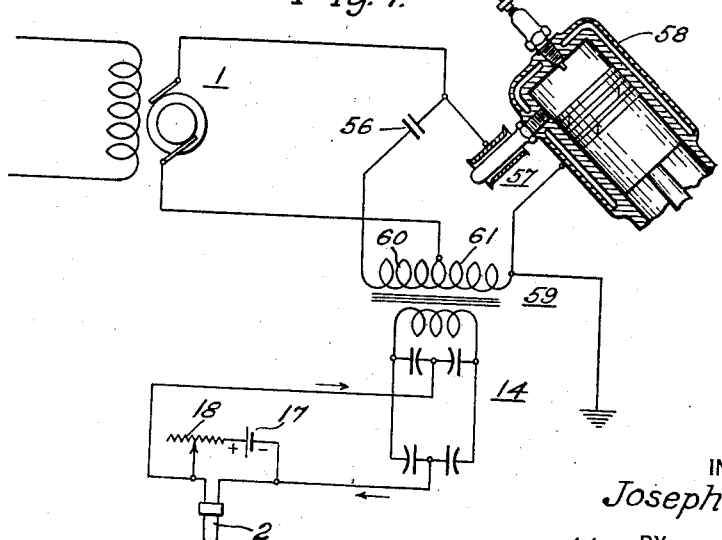
INVENTOR
Joseph W. Legg.
BY
Wesley G. Carr
ATTORNEY Patented Dec. 12, 1933

1,939,067

UNITED STATES PATENT OFFICE 1,939,067

INSTANTANEOUS PRESSURE RECORDER

Joseph W. Legg, Wilkinsburg, Pa., assignor to Westinghouse Electric & Manufacturing Company, a corporation of Pennsylvania Application January 5, 1929. Serial No. 330,591

7 Claims. (Cl. 177—351)

My invention relates to pressure recorders and particularly to those of the type which indicate pressure by optical means.

An object of my invention is to provide apparatus of the above-mentioned type that will accurately record or indicate wide variations in pressure that occur at either high or low frequencies.

A further object of my invention is to provide apparatus of the above-mentioned type that will not be affected by changes in temperature or by disturbing mechanical vibrations.

A still further object of my invention is to provide apparatus that will not be affected undesirably by fluctuations in the voltage supplied to the measuring apparatus.

A still further object of my invention is to provide a pressure-indicating unit which shall be small and portable.

In practicing my invention, I provide a capacity element, the capacity of which depends upon the pressure exerted upon it, a source of high-frequency alternating current, a rectifier, a galvanometer element and a circuit including the above specified apparatus so arranged that the amount of alternating current reaching the rectifier and galvanometer depends upon the degree of circuit unbalance caused by the pressure variations. At the lowest pressure to be measured, the greater part of the alternating current is balanced out before it reaches the rectifier and galvanometer. When the pressure increases, the capacity changes to further unbalance the circuit, and the galvanometer deflection is, accordingly, increased. This arrangement results in a pressure-recording apparatus which is not only more stable in operation than apparatus formerly available but is also responsive to a wider frequency range of pressure variations.

Further features and advantages of my invention will appear from the following description, taken in connection with the accompanying drawings, in which:

Fig. 3 is a view, in longitudinal section, of another form of pressure-responsive capacity element employed in my invention;

Fig. 4 is a view, in lateral section, taken on the line IV—IV of Fig. 3, and of the electrical connections employed.

Fig. 5 is a view, partly diagrammatic and partly in section, of the apparatus and the electrical connections employed in another embodiment of my invention;

Fig. 6 is a sectional view, taken on the line VI—VI of Fig. 5; and

Fig. 7 is a view, partly diagrammatic and partly in section, of the apparatus and the electrical connections employed in another embodiment of my invention.

Figure 1:
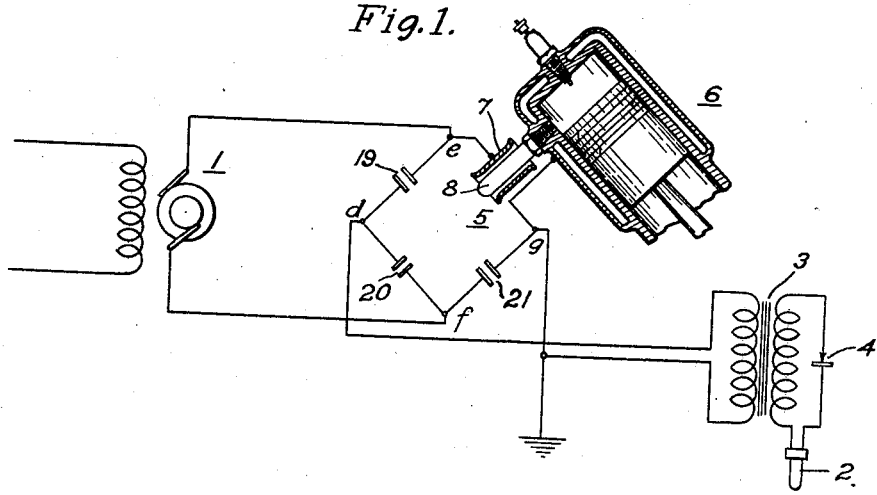
Figure 1 is a view, partly diagrammatic and partly in section, of the apparatus and the electrical connections employed in one embodiment of my invention.

Referring to Fig. 1, a Wheatstone capacity bridge $d$, $e$, $f$, $g$, has diagonally opposed terminals $e$ and $f$ connected to a source 1 of alternating current of comparatively high frequency; the frequencies between 5,000 and 50,000 cycles per second being found especially satisfactory in practice. The other two terminals are connected to the galvanometer element 2 through a transformer 3 and a rectifier 4.

One arm of the bridge includes a condenser 5, the capacity of which varies in accordance with pressure variations in the engine cylinder 6. This condenser is constructed in the form of a cylinder 7 and a tube or cylinder 8 spaced therefrom and communicating with the engine cylinder 6, the walls of the cylinder 8 being thin enough to expand under pressure and thus increase the capacity of the condenser 5. Since the percent change in the capacity of the condenser 5 is small, the change in capacity is directly proportional to the change in pressure.

The arms of the bridge are so adjusted that, at the lowest pressure to be recorded, the bridge is nearly balanced, and only a small portion (1%, for example) of the alternating current passes through the transformer 3 to the circuit including the galvanometer element 2. In operation, a decrease or an increase in pressure causes a corresponding change in alternating current through the primary of the transformer 3, and, consequently, of direct current through the rectifier 4 and galvanometer element 2.

Assuming that all but 2% of the alternating current is balanced out at a pressure having a value in the middle of the pressure range to be recorded, if the pressure variations cause a maximum change of 1% in the current in the bridge arm, containing the variable-capacity unit 5, the current supplied to the galvanometer circuit will vary between 1% and 3% of the current in that bridge arm. This, of course, gives a large percentage change in the current passing through the galvanometer 2.

Figure 2:
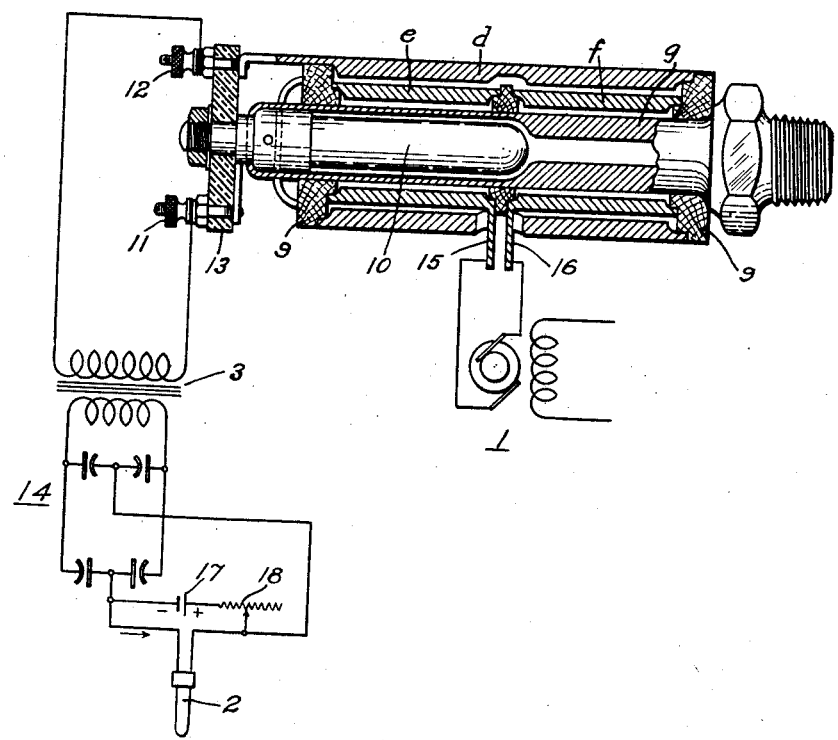
Fig. 2 is a view, partly diagrammatic and partly in section, of the pressure-responsive capacity element and the electrical connections employed in another embodiment of my invention.

The bridge circuit shown in Fig. 1 may comprise individual condensers 19, 20, 21, as indicated, but, preferably, it comprises elements arranged in a unitary structure as shown in Fig. 2.

The apparatus shown in Fig. 2 comprises a hollow cylinder $g$ threaded at one end so that it may be screwed into the wall of an engine cylinder. The left-hand portion of the cylinder $g$ has relatively thin walls which will expand under pressure, while the right-hand portion of the cylinder $g$ has thick walls which will not expand appreciably under pressure. A cylinder $e$ surrounds the left-hand portion of the cylinder $g$, a cylinder $f$ surrounds the right-hand portion of cylinder $g$, and a cylinder $d$ surrounds both cylinders $e$ and $f$. The cylinder $g$ and the cylinders $e$, $f$, $d$ are spaced from each other by insulating supports 9. A re-entrant portion 10 is provided to reduce the volume of gas contained in cylinder $g$.

Terminals 11 and 12 for the cylinders $g$ and $d$, respectively, are supported upon a panel 13 of insulating material attached to the left-hand end of the cylinder $g$. These output terminals 11 and 12 are connected to the primary winding of a transformer 3, the output of which is connected to a galvanometer element 2 through a rectifier 14. A high-frequency source 1 is connected to cylinders $e$ and $f$ through terminals 15 and 16.

A double-wave rectifier 14 of the copper-oxide disc type is preferably employed. One reason for having the bridge slightly unbalanced at all times, as mentioned above, is to lower the resistance of the rectifier 14, this type of rectifier having a very high resistance when no current is passing through it.

A circuit, including a battery 17 and a resistance unit 18, is shunted around the galvanometer element 2 in order to prevent a steady flow of direct current due to the initial bridge unbalance from passing through the galvanometer element 2. The resistance of the unit 18 is so high, as compared with the resistance of the galvanometer element 2 that only a small portion of the varying current caused by pressure variations passes through the unit 18 rather than through the element 2.

The condenser 19 in the upper left-hand arm of the bridge, shown diagrammatically in Fig. 1, comprises the outer surface of the cylinder $e$ and the left-hand portion of the cylinder $d$. The condenser 20, in the lower left-hand arm of the bridge, comprises the right-hand portion of the cylinder $d$ and the outer surface of the cylinder $f$. The condenser 21 in the lower right-hand arm of the bridge comprises the inner surface of the cylinder $f$ and the right-hand portion of the tube $g$. The pressure-responsive condenser 5 in the upper right-hand arm of the bridge comprises the inner surface of the cylinder $e$ and the left-hand portion of the tube $g$.

The unbalanced adjustment of the bridge not only serves to lower the resistance of the rectifier 14 but also serves to compensate for an error introduced by the rectifier. This error is caused by the fact that the output of the copper-oxide disc rectifier is not directly proportional to the rectifier input. It is also true that the output of the bridge is not directly proportional to the change in impedance in one of its bridge arms, the amount of this bridge distortion being dependent upon the amount the bridge is initially unbalanced. By connecting the rectifier 14 in the right direction in the circuit and by adjusting the amount of bridge unbalance, it is possible to make the galvanometer deflections directly proportional to the pressure variations.

The condenser structure shown in Fig. 2 provides a bridge circuit having connections of negligible length between condensers, for example, the connection between the condenser 20 in the lower left-hand arm of the bridge and the condenser 21 in the lower right-hand arm of the bridge is the metal in the cylinder $f$ which connects the inner and outer surfaces of that cylinder. The use of such short leads greatly decreases the possibility of the bridge being thrown out of adjustment, especially since the capacity to ground of these particular leads is the stray capacity which has the greatest effect on the bridge balance. Also, mechanical vibrations do not affect the adjustment of the bridge circuit when constructed as shown in Fig. 2, since a movement of an inner cylinder to one side will decrease the spacing between the inner and outer cylinders on that side by the same amount that it is increased on the opposite side.

A further advantage of this structure is that it is not readily thrown out of adjustment by expansion caused by heat, since the right-hand portion of the cylinder $g$ will expand substantially the same amount from this cause as will the left-hand portion of the cylinder $g$.

In Fig. 3 is shown a capacity bridge unit, similar to that shown in Fig. 2, which is connected in the pressure-recording circuit in the manner shown in Fig. 1. As shown in the drawings, the unit is approximately one and one-half times actual size. It comprises a heavy outer metal cylinder $g'$ having a threaded portion 22 at the upper end thereof for connection to a pipe communicating with an engine cylinder or any other source of pressure. The inner metal cylinder $g$ is securely held in position within, and concentric with, the outer cylinder $g'$ by being screwed into the inner threaded portion 23 of the outer cylinder.

Three concentric metal cylinders $e$, $d$ and $f$, supported by insulating end pieces 24, are mounted within the space between the inner cylinder $g$ and the outer cylinder $g'$. These cylinders are clamped in position by means of an end piece 25 and a ring 26 which is in screw-threaded engagement with the lower end of the outer cylinder $g'$. The joint between the end piece 25 and the outer cylinder $g'$ is made liquid-tight by means of a gasket 27. The end piece 25 supports terminals 28 and 29 for the cylinders $g$ and $e$, respectively, and for the cylinders $d$ and $f$, the terminals for the cylinders $d$ and $f$ not being shown on the drawings.

It will be noted that the inner cylinder $g$ is electrically, as well as mechanically, connected to the outer cylinder $g'$. The inner cylinder $g$ is filled with oil, such as ordinary lubricating oil, which transmits the engine pressure to the walls of the cylinder. The greater part of the space between the cylinders $g$ and $g'$ and the cylinders $e$, $d$, and $f$ is filled with oil, such as castor oil, for increasing the capacity between the cylinders. This oil may be put into the unit by removing the screws 30. The cylinders $e$, $d$ and $f$ are provided with a plurality of holes 31 in the walls thereof for permitting movement of the oil so that the cylinder $g$ can expand during pressure measurements. An air space 32 is provided near the top of the cylinder for the same purpose.

Referring to both Fig. 1 and Fig. 4, the condenser 21 in the lower right-hand arm of the bridge comprises the inner surface of the outer cylinder $g'$ and the outer surface of the cylinder $f$. The condenser 20 in the lower left-hand arm of the bridge comprises the inner surface of cylinder $f$ and the outer surface of cylinder $d$. The condenser 19 in the upper left-hand arm of the bridge comprises the inner surface of cylinder $d$ and the outer surface of cylinder $e$. The pressure-responsive condenser 5 in the upper right hand arm of the bridge comprises the inner surface of the cylinder $e$ and the outer surface of the cylinder $g$. The inner and outer cylinders $g$ and $g'$ are connected to one terminal of the output circuit 33 while the middle cylinder $d$ is connected to the other terminal of that circuit. The cylinders $e$ and $f$ are connected to the terminals of the input circuit 34.

It is obvious that, with respect to short leads and freedom from trouble due to mechanical vibrations, this structure has the same advantages as the structure shown in Fig. 2. In this construction, however, the difficulty due to expansion caused by heat is avoided by filling the tube $g$ and a portion of the pipe leading to it with oil and, in that way, preventing any hot gases from reaching the condenser-bridge unit. This apparatus, as in that shown in Fig. 2, is so adjusted that the capacity bridge is slightly unbalanced at the lowest pressure to be recorded. Accordingly, when the gas in the engine cylinder is at atmospheric pressure, an increase in pressure will further unbalance the bridge, while a decrease in pressure will cause the bridge to become more nearly balanced.

Since the alternating current appearing in the bridge output increases with an increase in the unbalance of the bridge, the amount of rectified current passing through the galvanometer element will likewise increase with an increase of bridge unbalance. The greater the cylinder pressure, therefore, the greater will be the galvanometer deflection. The frequency of the alternating current supplied to the bridge should be high compared with the frequency of the pressure variations and it also should be comparatively high because of the small capacity of the condensers employed in the bridge.

The apparatus shown in Fig. 5 differs from that shown in Fig. 1 in that the alternating current is supplied to the rectifier 14 and galvanometer 35 through two inductance coils 36 and 37 connected in opposition rather than through a capacity bridge. A variable-capacity element 38, provided with water cooling means, is shown communicating with an engine cylinder 39. The capacity element 38 is cooled by water entering the inner tube 40 at the lower end through the pipe 41 and leaving it at the upper end through the other pipe 42, as indicated by the arrows. Gas from the engine cylinder 39 enters the space between tubes 40 and 42 and is cooled when it strikes tube 40.

The wall of the tube 42 is thin enough to expand in accordance with pressure variations of the gas and thereby vary the capacity between the tube 42 and the outer tube 43.

The high-frequency current is fed from the generator 1 to the rectifier 14 and galvanometer 35 through one circuit including the secondary 44 of a transformer 45, a primary winding 36 of a second transformer 46 and the pressure-responsive condenser 38. The high-frequency current is also fed to the rectifier 14 through a second circuit including a portion of the secondary 44 of the transformer 45, a second primary winding 37 of the transformer 46 and a variable condenser 47. The two primary windings 36 and 37 are connected in opposition, and an adjustment made by either the variable contact 48 or the variable condenser 47 or by both so that, at the lowest pressure to be measured, a small percentage (1%, for example of the alternating current passes through the rectifier 14 in order to lower the rectifier resistance.

The output of the rectifier passes through the winding 49 of the galvanometer 35 and through an inductance coil 50. A condenser 51 is preferably shunted around the galvanometer winding 49 so that it, in conjunction with the inductance coil 50 will prevent high-frequency currents from flowing through the galvanometer winding 49. If the frequency of the alternating-current from the source 1 is so high that it will have but little effect upon the galvanometer deflection, the inductance coil 50 and condenser 51 may be omitted.

The galvanometer deflecting element 52, which comprises a strip under tension carrying one or more small permanent magnets (not shown), is deflected in accordance with the unbalance of the circuit caused by the varying capacity of the pressure-responsive element. This deflection is recorded by means of a beam of light supplied by the lamp and deflected to the film by the galvanometer mirror 55.

The galvanometer 35, illustrated in Fig. 5, is described and claimed in my copending application, Serial No. 221,601, filed Sept. 23, 1927, which issued March 11, 1930, as Patent No. 1,750,275.

The tubes comprising the pressure-responsive element 38 may be either cylindrical in cross-section or of the flattened tubular form shown in Fig. 6. If made in the form shown in Fig. 6, the element 38 will be more sensitive to pressure variations than when in the cylindrical form, but it will not respond to as high-frequency-pressure variations.

The apparatus shown in Fig. 7 differs from that shown in Fig. 5 in that the circuit arrangement more closely resembles the usual form of Wheatstone bridge. It differs from the circuit shown in Fig. 1 mainly in that the two lower arms of the bridge include inductance coils rather than condensers.

The upper left-hand arm of the bridge includes a fixed condenser 56 while the upper right-hand arm of the bridge includes a pressure-responsive capacity element 57, similar to that shown in Fig. 1, which communicates with the engine cylinder 58. The galvanometer 2 and the rectifier 14 are connected to the output of the bridge through a transformer 59, the primary of which consists of the coils 60 and 61 in the lower bridge arms. The galvanometer deflecting element 2 is shunted by a battery 17 and a resistance unit 18 for keeping the steady direct-current component out of the deflecting element 2, as explained in connection with Fig. 2.

One terminal of a high-frequency source 1 is connected to a point intermediate the two condensers 56 and 57 while the other terminal is connected to a point between the two inductance coils 60 and 61. As in the case of the circuits previously described, the circuit is slightly unbalanced at the lowest pressure to be measured. Any increase in pressure will, therefore, unbalance the bridge and cause a corresponding increase in the galvanometer deflection.

If desired, the variable-capacity element 57 and the industance coil 61 may be tuned to resonance at the frequency of the alternating current supplied by the source 1 so that the circuit will be more sensitive to pressure variations.

It will be noted that all of the circuits described are so balanced that the galvanometer deflection is not affected greatly by a variation in the voltage of the high-frequency source.

Various modifications may be made in my invention without departing from the spirit and scope thereof, and it is desired, therefore, that only such limitations shall be placed thereon as are shown by the prior art and set forth in the appended claims.

I claim as my invention:

1. In a Wheatstone bridge, two electrically conducting tubular elements, a third electrically conducting tubular element located adjacent to, and spaced concentrically from, said first two elements, said third element constituting a condenser plate in each of two arms of said bridge and also constituting a connection of negligible length therebetween whereby variable stray capacity effects are eliminated.

2. An article of manufacture comprising an electrically conducting tube, having an expansible and a non-expansible portion, a second electrically conducting tube spaced from the expansible portion of said first tube, a third electrically conducting tube spaced between said second tube and said expansible portion, and a fourth electrically conducting tube spaced between said third tube and said non-expansible portion, said tubes being disposed concentrically and cooperating to constitute a plurality of capacity elements interconnected by conductors of negligible length, insulating means for supporting said tubes in spaced relation, and connection means associated with said first tube whereby it may be conveniently connected to a source of pressure.

3. Apparatus comprising a non-expansible electrically conducting tube, an expansible electrically conducting tube mechanically and electrically connected thereto, an electrically conducting tube spaced from said first two tubes, a terminal connector for said first two tubes whereby they may be connected to one terminal of an electrical circuit and a terminal connector for said third tube whereby it may be connected to another terminal of said electrical circuit, an electrically conducting tube spaced between said third tube and said expansible tube, and an electrically conducting tube spaced between said third tube and said non-expansible tube, terminal connectors associated with said last two tubes whereby they may be connected, respectively, to the terminals of a second electrical circuit and insulating supports for said terminals and tubes.

4. In a Wheatstone bridge indicating system, a plurality of conducting plates assembled in spaced relation, insulating means for supporting said spaced plates in insulated relation as a unitary structure, an indicator circuit connected to a pair of said plates, a source of current connected to another pair of said plates whereby the electrostatic capacity between either surface of each plate and the adjacent surface of each adjacent plate constitutes the impedance element in one leg of the bridge and variable stray capacities are eliminated, and means for varying the capacity between one pair of adjacent plates according to a quantity to be measured.

5. In a pressure responsive device a tube of electrically conducting material comprising a pressure chamber closed at one end, connection means associated with the open end of the tube whereby the device may be conveniently associated with a source of pressure, a larger tube of electrically conducting material concentrically disposed about said first tube and means for supporting said second tube in insulated spaced relation thereto whereby expansion and contraction of said first tube will induce variable capacity effects which may be utilized to influence an electrical circuit.

6. In a pressure responsive device a tube of electrically conducting material comprising a pressure chamber closed at one end, connection means associated with the open end of the tube whereby the device may be conveniently associated with a source of pressure, a larger tube of conducting material electrically and mechanically connected to said first tube in spaced concentric relation thereto, a plurality of conducting tubes of various intermediate diameters concentrically disposed within the space between said first and second tubes and insulating means for supporting said intermediate tubes in insulated spaced relation.

7. In a pressure responsive device a tube of electrically conducting material comprising a pressure chamber closed at one end, connection means associated with the open end of the tube whereby the device may be conveniently associated with a source of pressure, a larger tube of conducting material electrically and mechanically connected to said first tube in spaced concentric relation thereto, a plurality of conducting tubes of various intermediate diameters concentrically disposed within the space between said first and second tubes, insulating means for supporting said intermediate tubes in insulated spaced relation, a terminal connector associated with each tube and an insulating support for said terminal connectors carried by said outer tube.

JOSEPH W. LEGG.